United States Patent
Martinesco et al.

[15] 3,659,357
[45] May 2, 1972

[54] AUDIO-VISUAL APPARATUS

[72] Inventors: Dimitri Martinesco, 51 Residence du Clos, Verrieres-le-Buisson, 91; Charles L. Marsot, 3 Avenue Foch, Paris, 16, both of France

[22] Filed: Dec. 11, 1969

[21] Appl. No.: 884,241

[30] Foreign Application Priority Data

Dec. 12, 1968 France.................................177825

[52] U.S. Cl................................35/35 C, 179/100.2 T
[51] Int. Cl...........................G09b 5/06, G11b 5/00
[58] Field of Search..........................35/8 A, 35 C, 35 E; 179/100.2 T, 100.2 MI; 274/41.4

[56] References Cited

UNITED STATES PATENTS

| | | | |
|---|---|---|---|
| 2,548,011 | 4/1951 | Frost | 35/35 C |
| 2,822,425 | 2/1958 | Hicks | 35/35 C |
| 2,936,342 | 5/1960 | Kallmann | 35/35 C X |
| 3,521,007 | 7/1970 | Laghaie | 35/35 C X |

Primary Examiner—Wm. H. Grieb
Attorney—Charles E. Temko

[57] ABSTRACT

An audio-visual device adapted for instance for teaching foreign languages is provided with a substrate on which is disposed alternating rows of written matter and sound recorded tracks, adjacent rows being logically related to one another, for example, a recorded track may contain a translation of the adjacent written matter. Several embodiments are shown including one in which a sound track reading head disposed in a reading arm is driven along a sound track wherein the reading arm is removed from above one line when it has been read and put into position above the next line. In another embodiment, the substrate is formed as sheets in a loose-leaf binder which are turned after a side has been read and listened to. In a final embodiment, means are provided for automatically displacing the reading arm and the magnetic tape reading head between adjacent lines as well as a drive for returning the magnetic tape reading head to its starting position at a high speed.

5 Claims, 14 Drawing Figures

INVENTORS
DIMITRI MARTINESCO,
CHARLES L. MARSOT

A TRAVERS.....

INVENTORS
DIMITRI MARTINESCO,
CHARLES L. MARSOT

INVENTORS
DIMITRI MARTINESCO,
CHARLES L. MARSOT

INVENTORS
DIMITRI MARTINESCO,
CHARLES L. MARSOT

INVENTORS
DIMITRI MARTINESCO,
CHARLES L. MARSOT

AUDIO-VISUAL APPARATUS

The invention relates to an audio-visual information device especially for use in achieving educational objectives in particular for teaching modern languages.

Audio-visual devices for teaching are already known which include magnetic tapes which have visual information thereon and which are played on tape recorders.

In these known devices the reading speed is imposed by the speed of the tape passing through the tape recorder so that they cannot be adapted for users having different abilities.

Further, in such known devices the repetition of the visual information as well as the sound track information, which is desirable in teaching, is difficult principally because of the manipulation of the tape recorder apparatus for reversing the direction of movement of the tape in order to pass it again through the playback head.

It is an object of the invention to provide an audio-visual device, for achieving educational objectives, for example teaching modern languages which overcomes inconveniences of known devices.

It is a particular object of the invention to provide such a device in which the visual reading is performed by each user at his own speed of comprehension, for individual instruction.

It is also an object of the invention to provide an apparatus which is of convenient size and which contains great quantities of information.

It is also an object of the invention that such an apparatus be easily operated to present the information in the customary visual manner and thereby be of great value for education.

The device according to the invention assembles on the same support information which is visually readable by the user and information which is read by a sound reading head and is characterized in that the information visually readable by the user and the information which is read by the sound reading head are disposed on the support adjacent one another in a plurality of tracks, the playback or sound reading head being movable along the various tracks carrying the audio information.

The information support of the device according to the invention thus includes, on one hand, printed matter, letters, numbers etc. forming a text, and on the other hand a sound recording track adjacent to the printed matter and which, by cooperating with the mobile sound reading head, reproduces a sound track which corresponds to the adjacent printed text, which for example is a sound reproduction of the text, an explanation, a paraphrase or the like.

In one of the embodiments, the information support comprises an elongated tape having a width sufficient to carry a plurality of lines of written matter and a plurality of sound recording tracks logically related to one another, the tape being displacable relative to a plurality of viewing windows equal in number to the lines of the written matter and the sound magnetic tracks.

In such a device, the tape is immobile relative to the viewing windows during the reading and the magnetic reading head is displaced along the magnetic tracks in succession.

In another embodiment, the information support comprises a plurality of pages or sheets maintained in a binder and which includes means for positioning the magnetic track reading head.

In such an embodiment, which assures a high quality sound reproduction whatever is the manner of use, the binder is preferably a loose-leaf binder means being provided on the covers of the said binder for the positioning of the sound playback head.

In a modification of the preceding embodiment which is of compact design and particularly simple to operate, the drive means for displacing the magnetic track reading head is disposed in the binder.

The invention will be fully understood from the description which follows, made by way of example, and referring to the accompanying drawing, wherein.

Figure 1:
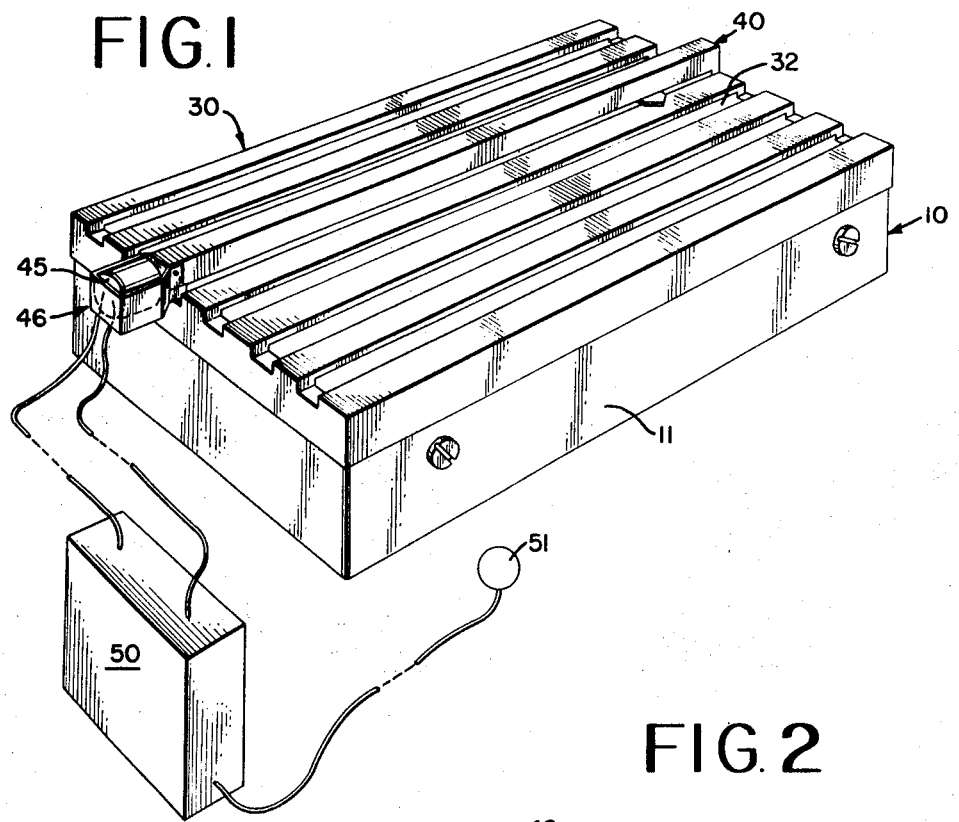
FIG. 1 is a general perspective view of a first embodiment according to the invention.
Figure 2:
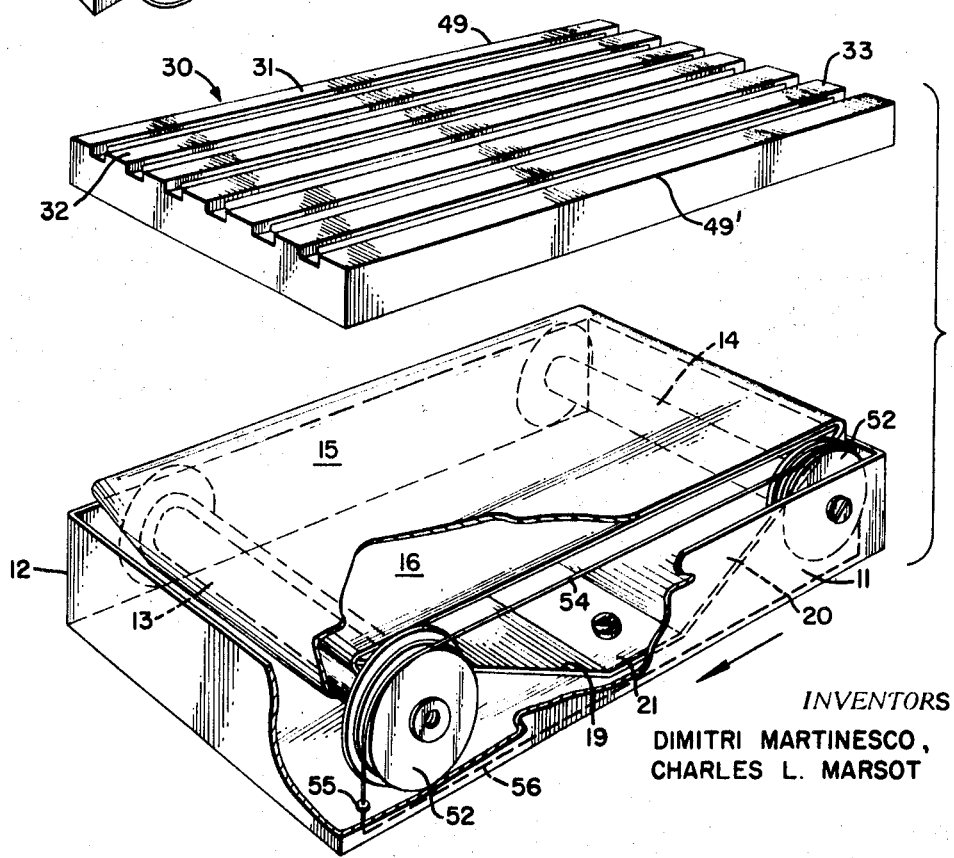
FIG. 2 is a general perspective view with the cover raised above the body of the casing and with broken away portions.
Figure 3:
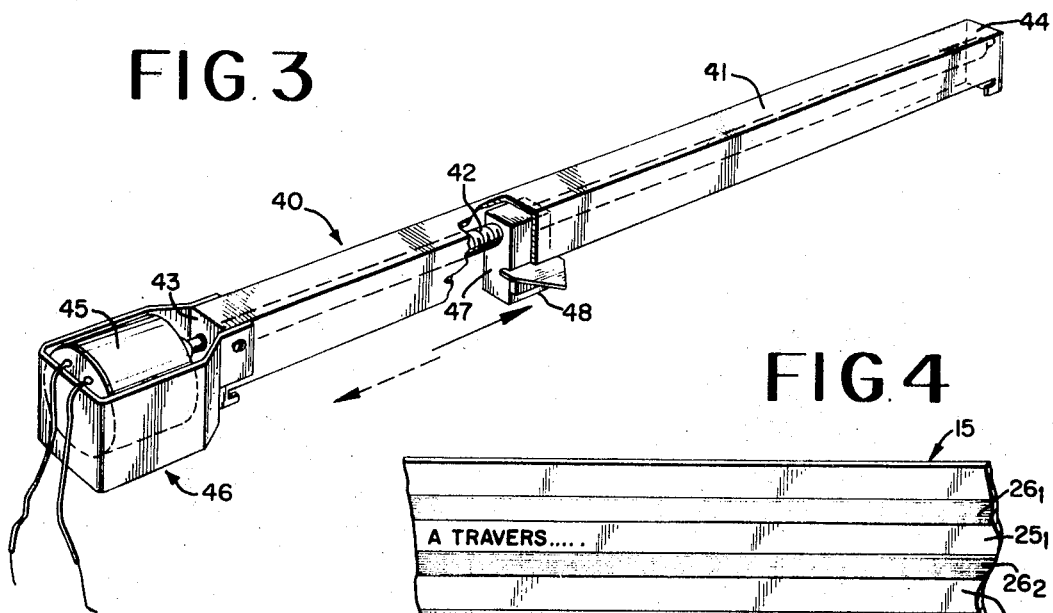
FIG. 3 is a perspective view of the reading arm.
Figure 4:
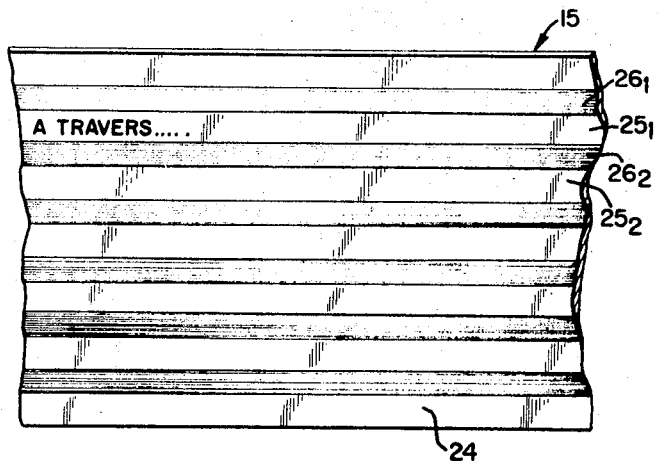
FIG. 4 is a plan view of a portion of the information support.
Figure 5:
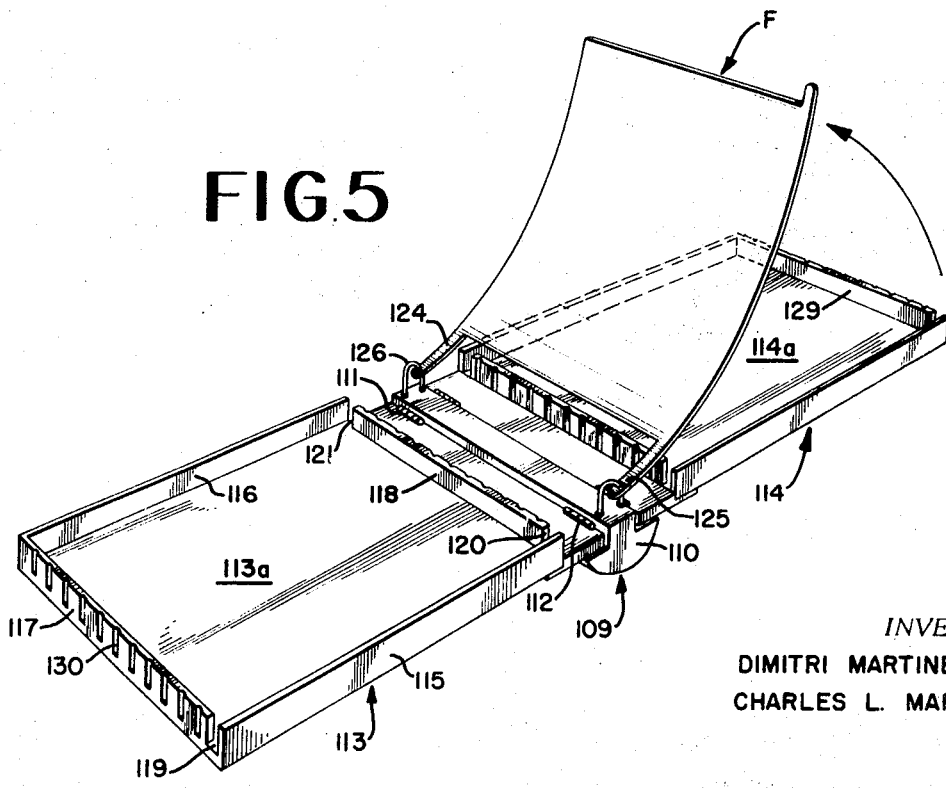
FIG. 5 is a schematic view in perspective of an alternative embodiment.

The embodiment of the invention shown in FIGS. 1 to 4 includes a parallelipiped-shaped casing 10 with two long sides 11 and 12 between which are fixedly mounted a first reel 13 and a second reel 14 arranged parallel to one another. A tape or sheet 15 is wound on the reel 13 and attached at its other end to the other reel 14. Between the reel 13 and the reel 14, the tape 15 is supported on a flexible sheet 16 (FIG. 2) formed of rubber or analogous plastics material which passes along the wings 19 and 20 formed of rigid material. The wings extend from a plate 21 which is fixed on bottom of the casing 10.

In the starting position, the tape 15 is completely wound on the reel 13 and attached at an end to the reel 14. The upper face 24, of the tape carries a certain number of lines $25_1$, $25_2$, etc. (FIG. 4) of printed text, between adjacent lines are disposed magnetic sound recording tracks $26_1$, $26_2$, etc. The recording on the recording track $26_1$ above and adjacent to the line $25_1$ can be the recording of the text of the line $25_1$, the recording of the track $26_2$ can be the text of line $25_2$ and so on.

The body of the casing 10 is provided with a cover 30 enclosing the tape and the reels. At least the upper surface 31 of the cover being formed of transparent material and including alternating void and full portions. The full portions 33 are disposed above the printed lines and the void portions 31 are disposed above the recording tracks when the cover is placed in position on the body.

A reading arm 40 (FIGS. 1 and 3) is disposed on the casing. It includes a housing 41 having a U-shaped cross-section in which is seated a threaded shaft 42 maintained in the housing ends 43 and 44 so that it is able to turn in the housing ends 43 and 44 without being longitudinally displaced. The spindle 42 is coupled to the out-put shaft of a miniature electric motor 45 which is mounted in a bracket 46 which is fixed to the casing. A nut 47 supporting a magnetic track reading head 48 cooperates with the threaded spindle 42.

Means are provided for permitting the displacement of the arm 40 parallel to the sides 49 and 49' of the cover 30.

The magnetic track reading head 48 is connected by means of an amplifier and a source of electricity disposed in a casing 50, to a listening device 51: ear-phones or head-phones.

Means are provided for displacing the tape 15 so that the portion which faces the cover can be displaced and replaced by the following portion. This means can include the pulleys 52 and 53 mounted on the reels 13 and 14 preferably with a device having a one-way drive. A cord 54 passes over the pulleys, through holes 55 in the bottom of the casing and thus provides a lower gripping strand.

The operation of this embodiment is as follows:

The first printed section of the tape faces the cover 30. The text carried on the tape is visible through the transparent portions 33 of the cover. The arm 40 is so placed on the casing that it overhangs a void portion 32. The miniature motor 45 is started. The magnetic track reading or playback head 48 moves from left to right with regard to the magnetic track $26_1$ and the user hears the sound reproduction disposed on this magnetic track so that simultaneously, the text which is printed on the line $25_1$ is read and listened to.

Preferably, when the actuating member for the miniature motor is right, said motor effects the reversal of the direction of rotation thereof and at a speed twice of that during the displacement of the magnetic track reading head from left to right, whereby after reading one line, the magnetic head 48 is rapidly returned to its starting position.

When the first line has been read and listened to, the arm 40 is displaced so that it faces the portion $26_2$, the second line can then be read and listened to, and so on.

When the last line of the visible section located beneath the portion 30 of the cover has been read, a tensile force is exerted against the string 54 along the strand 56 which winds the section which has been read into the receiving reel 14 and replaces this section with the following section in position facing the window. The following section is read in the same manner as described above. Reading can continue as long as desired or until the end of the tape.

Reference will now be made to FIGS. 5 to 9 relative to another embodiment.

In this embodiment, the device according to the invention includes a binder 109 of the loose-leaf type, on the spine 110 of which two covers 113 and 114 are pivotally mounted about hinges 111 and 112. Each cover comprises a rectangular container preferably formed of rigid plastics material. The rectangular container 113 includes two parallel flanges 115 and 116 extending along the long sides and two parallel flanges 117 and 118 extending along the short sides. A slot 119 is provided between the flange 115 and the flange 117 and a pair of slots 120 and 121 are provided at the ends of the flange 118 between the long flanges 115 and 116 respectively. The cover 114 is formed in identical manner as cover 113.

Along the exterior faces of the flanges along the short sides 117, 118 of the cover 113 and 128,129 of the cover 114 are disposed parallel equidistant grooves 130 which are arranged perpendicular to the bottoms 113a and 114a of the covers 113 and 114 respectively.

Each of the covers 113 and 114 is adapted to receive rectangular sheets F (FIG. 6) whose dimensions are substantially those of the bottoms 113a and 114a having long sides 122, 122' and the short sides 123, 123'. The extension of the sides 122, 122' of the sheet F adjacent to the side 123 forms straps 124 and 125 for maintaining the sheet F in the binder 109 in cooperation with the rings 126 and 127. One of the long sides, for example side 122', is extended at its end opposite the strap 125 by a tab 125'.

Figure 6:
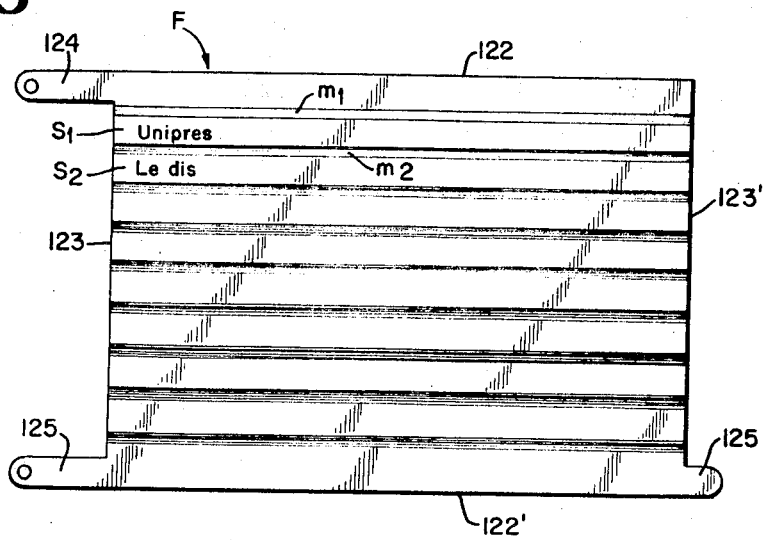
FIG. 6 is a plan view, on a much larger scale, of an information support formed as a sheet.

Each page or sheet F carries on at least one of its sides, preferably on both of its sides, lines of written matter as shown at $s_1$, $s_2$, etc. in FIG. 6 and adjacent to each of said lines sound recording tracks as shown at $m_1$, $m_2$, etc. The lines of written matter and the sound recording tracks adjacent to one another have a logical relationship, for example the recording carried on the track is that of the text immediately adjacent thereto. The tracks $m$ are arranged on the sheets F so that when a sheet is disposed in the cover 113 or the cover 114, each of the recording tracks is aligned with two grooves 130 provided in the opposite flanges 117, 118 or 128, 129 of the covers 113 and 114 respectively.

A magnetic playback head 147 disposed in an arm 131 (FIGS. 7 and 8) is adapted to cooperate with the magnetic tracks $m$. The arm 131 includes a casing having a U-shaped cross-section preferably comprising two portions 131a, 131b which are pivotally mounted relative to each other about a hinge 132. Resilient means are provided for maintaining the arm 131 in its unfolded position, i.e. with the portions 131a and 131b as extensions of one another. The arm 131 is provided at its ends with flange portions 134 and 135 forming with the tab 136 and the tab 137 two slots having a width corresponding to the thickness of the flanges 117, 118, 128 and 129 of the covers 113 and 114.

Balls 138 are mounted in the end portions 134 and 135 by means of resilient means and are adapted to cooperate with the slots 130 in the flanges 117, 118, 128 and 129 for precisely positioning the reading arm 131 parallel to the long sides of the covers 113 and 114.

In the vicinity of the end of arm 131 carrying the tab 135 and the end portion 137, said arm carries a miniature motor for driving an endless belt 145. The lower strand 145a of endless belt 145 is fixed to the playback head 147 which is pivotally mounted about a transverse axis relative to the longitudinal direction of the belt. By means of a screw 149, the angle of inclination of the playback head 147 can be adjusted to obtain in all its positions of use excellent sound reproduction.

Resilient means assure tension in the endless belt 145 in order to provide linear displacement of the playback head 147 without vibrations when the motor 140 is operated.

Lead wires 150 extending from the playback head 147 are connected to an amplifier disposed in a casing 151 which is in turn connected to a listening device 152 by a wire 153. The listening device 152 may be ear-phones or head-phones.

The casing 151 encloses an electric power supply 163 (FIG. 9) which is connected by means of a wire 154 which includes the conductors 150 to an operating switch for the miniature motor 140. The switch 155 includes fixed contacts 156, 157, 158 and 159 which are adapted to cooperate with two switch blades 160, 161 connected to the miniature motor 140 and is operated by a push-button 162. The fixed contacts 156 and 159 of the switch 155 are connected to the negative pole of the power supply 163. The terminal 157 is connected to the positive pole of the power supply and the terminal 158 is connected to a voltage regulator 164 which is also disposed in the casing 151. The power supply 163 provides the input to the voltage regulator 164 whose regulated output 165 voltage is of a predetermined value which assures a constant output speed for the motor 140 regardless of the voltage across the power supply 163. The supply 163 normally comprises a series of batteries. A main circuit breaker 166 is disposed on the casing 151 and effects the actuation of the device. A volume control 167 (FIG. 7) is provided for regulating the sound level in the listening device 152 which is also disposed on the casing 151. The casing 151 preferably encloses a potentiometer associated with the regulator 164 for regulating the speed of the miniature motor.

The operation of this embodiment is as follows:

The arm 131 is unfolded and put in place on the binder 109 which is opened so that the short sides of the cover, for example sides 128, 129 of the cover 114, are engaged in the slots formed by the tabs 136, 137 and the end portions 134, 135 of arm 131. The balls 138 cooperate with the grooves 130 owing to the force exerted by the resilient means so that the reading arm is firmly maintained in place.

Figure 7:
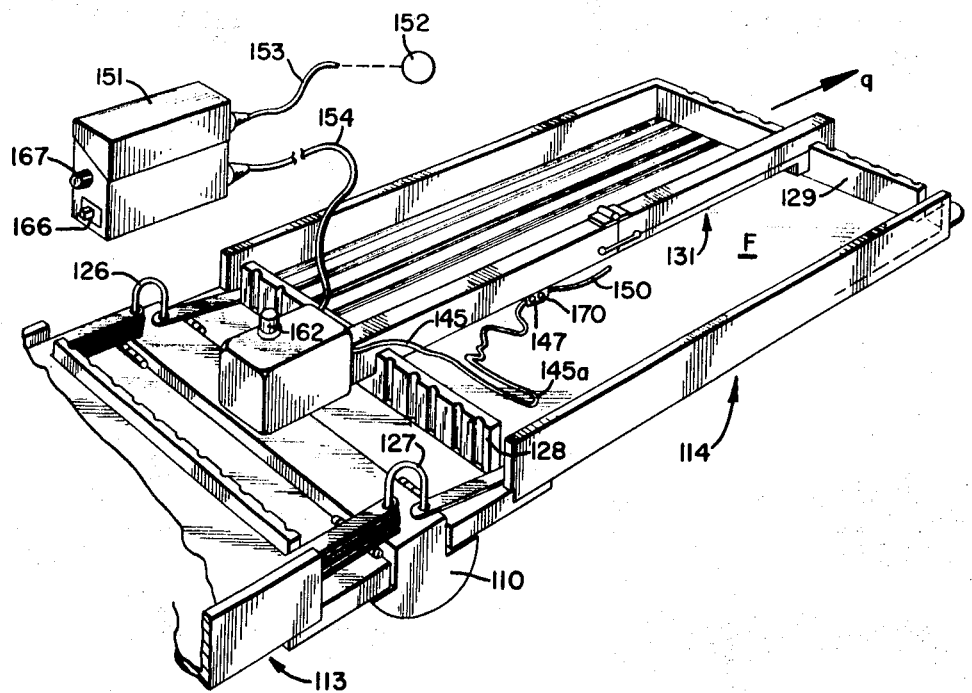
FIG. 7 is a perspective view of the device shown in FIG. 5 equiped with a playback head.
Figure 8:
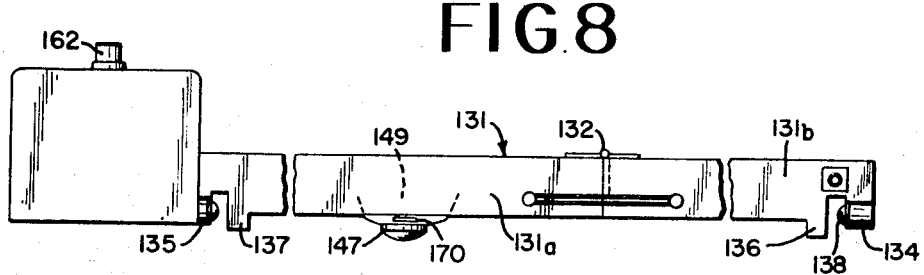
FIG. 8 is an elevation view of the arm carrying the playback head.
Figure 11:
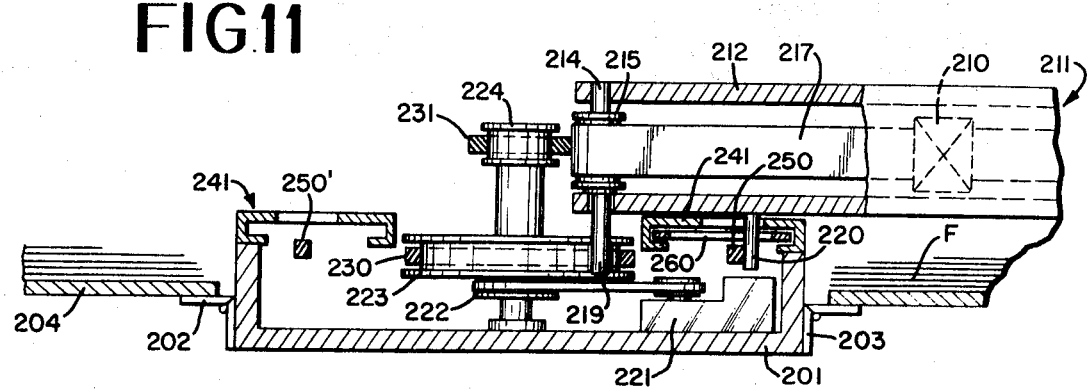
FIG. 11 is a view partially in section taken along the line II—II of FIG. 10 and on a larger scale.

The main switch 166 is closed when the miniature motor is started by actuating the push-button 162 (FIG. 7). The playback head 147 has a pointer fixed therewith and is displaced in the direction indicated by the arrow $q$ along the sound recorded track $m$ which is aligned with the grooves 130 in which the balls 138 are engaged. The user listens to the sound reproduction of the recording which is carried on the track and at the same time reads the text which he is listening to and which is printed on the adjacent line $s$ as the pointer 170 is displaced along the line.

By leaving the push-button 162, the blades 160 and 161 of the switch 155 are moved into contact with the terminals 156 and 158, i.e. in the position in which the miniature motor 140 is operated at a much great speed than previously and in a direction effecting the displacement of the playback head 147 in a direction opposite to that indicated by the arrow $q$. After reading a line, the magnetic tape head 147 is rapidly returned to its starting position adjacent to the miniature motor.

When the first line of the sheet F is both read visually and by the playback head, the arm 131 is removed and brought into position again on the cover in order that the balls 138 can cooperate with the grooves 130 which are adjacent to those in which the balls where previously placed. The reading of the second line visually and by the playback head can then take place, and so on.

When the last line of the sheet or page F has been read and after removal of the reading arm 131, the page is turned and the reading arm moved into cooperation with the flanges 117 and 118 of the cover 113 when the same page F is provided with written matter and magnetically sound recorded matter on each of its sides as would often be the case.

In an embodiment, the pages or sheets F are formed initially as an ordinary magnetic sheet, i.e. comprising a substrate on the both sides of which are disposed a layer of magnetic material. A thin layer of light colored non-magnetic material permits the printing of the printed matter thereon.

According to a modification, the pages or sheets F are initially comprised of material which permits the writing or printing of written matter on both its sides and thin strips of magnetic material are then placed thereon to record sound information.

Referring next to FIGS. 10-14, there is shown an embodiment of the audio-visual device which includes a binder 200, of the loose-leaf type, including a spine 201 for mounting two covers 204 and 205 about hinges 202 and 203. The covers are formed as shallow rectangular containers preferably formed of rigid plastics material.

Each cover is adapted to receive rectangular pages or sheets F, of the type shown in FIG. 6, which have lines of printed matter as shown at $s_1$, $s_2$, etc. and adjacent to each of these lines a sound recorded track carrying magnetically recorded sound information as shown at $m_1$, $m_2$, etc. on at least one and preferably both of their sides. The written matter and the sound recorded tracks adjacent thereto have a logical relationship, for example the sound recording carried on the recording track is that of a sentence or a text written on the adjacent line of written matter, or a translation of the text in a foreign language or the like.

The sheets F are placed in the covers 204, 205 and are mounted in the binder 200 by rings or analogous elements 206, 207, 208 and 209.

A playback head 210 is adapted to cooperate with the recording tracks m. The playback head is mounted in an arm 211 which is of substantially U-shaped cross-section and includes an upper wall 212 (FIG. 11) and front and rear lateral walls 213' and 213. The front lateral wall carries a magnifying lens extending along the length of the arm.

Pulley drums 215 and 216 are fixed to shafts 214 and 214' which are rotatably mounted in the upper wall 212 at the two ends of said arm. An endless belt 217 passes over the drums 215 and 216 and on said belt is fixed a magnetic sound reading head 210 preferably by resilient means 218 for assuring tension in the belt, for example by a strip of rubber ribbon having the same width as the belt.

At the lower edge of the wall 213 and in the vicinity of the two ends of the arm are fixed to pins, for example 220, of substantially the same length as the fingers, for example 219, which extend from the drums 215 and 216 opposite the shafts 214 and 214'.

In this embodiment the means for controlling the movement of the playback head 210 are disposed in the spine 201 of the binder 200.

Said means comprise a miniature motor 221 which is powered by batteries disposed in the spine 201 and is set in motion when the on-off switch (not shown) is actuated. The miniature motor 221 rotates the shaft 222 on which are fixed the pulleys 223 and 224 having different diameters. The pulley 224 having a smaller diameter, is placed above the pulley 223. At the end of the spine 201 opposite location of the shaft 222 are mounted a pulley 228 having the same diameter as the pulley 223 and a pulley 229 having the same diameter as the pulley 224. A pulley belt 230, preferably formed of rubber, cooperates with the pulleys 223 and 228. A pulley belt 231 of the same material cooperates with the pulleys 224 and 227. The belts are driven in the same direction as shown by the arrows $f_1$ and $f_2$ in FIG. 12 when the miniature motor 221 is operative.

The rubber pulley belts 230 and 231 are adapted to cooperate, respectively, with the endless belt 217 carrying the playback head 210 and with the fingers 219 extending from the drums 215 and 216 as will be described in more detail hereinbelow.

Figure 12:
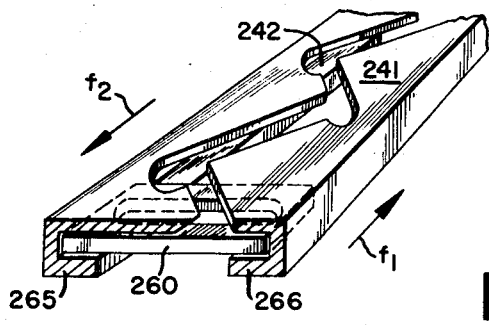
FIG. 12 is a perspective view of a portion of the means for positioning the reading arm.
Figure 13:
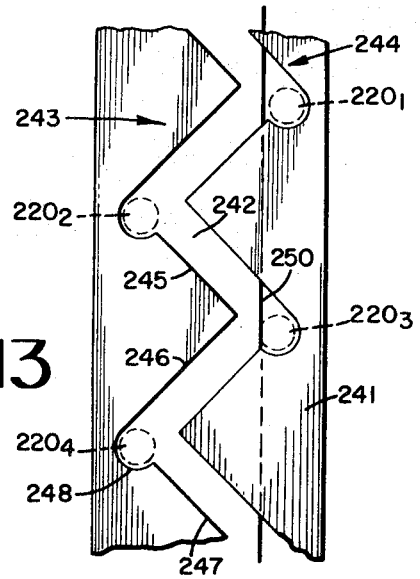
FIG. 13 is a corresponding plan view on a much larger scale.
Figure 14:
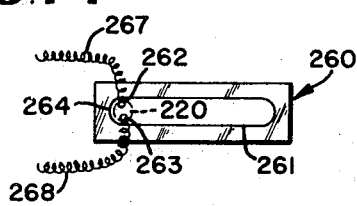
FIG. 14 is a plan view of a member comprising a part of a device according to the invention.
Figure 9:
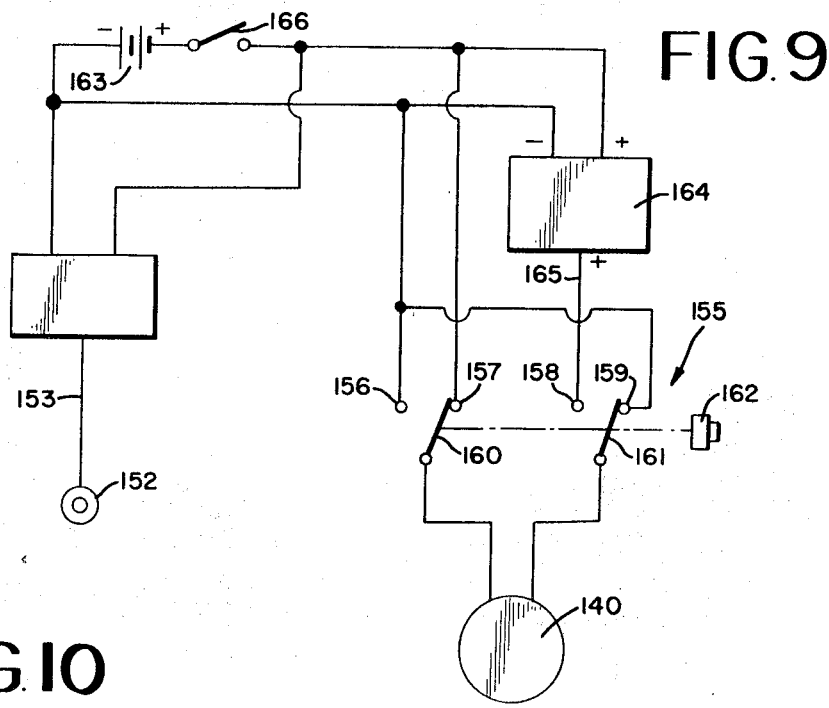
FIG. 9 is an electric circuit diagram.
Figure 10:
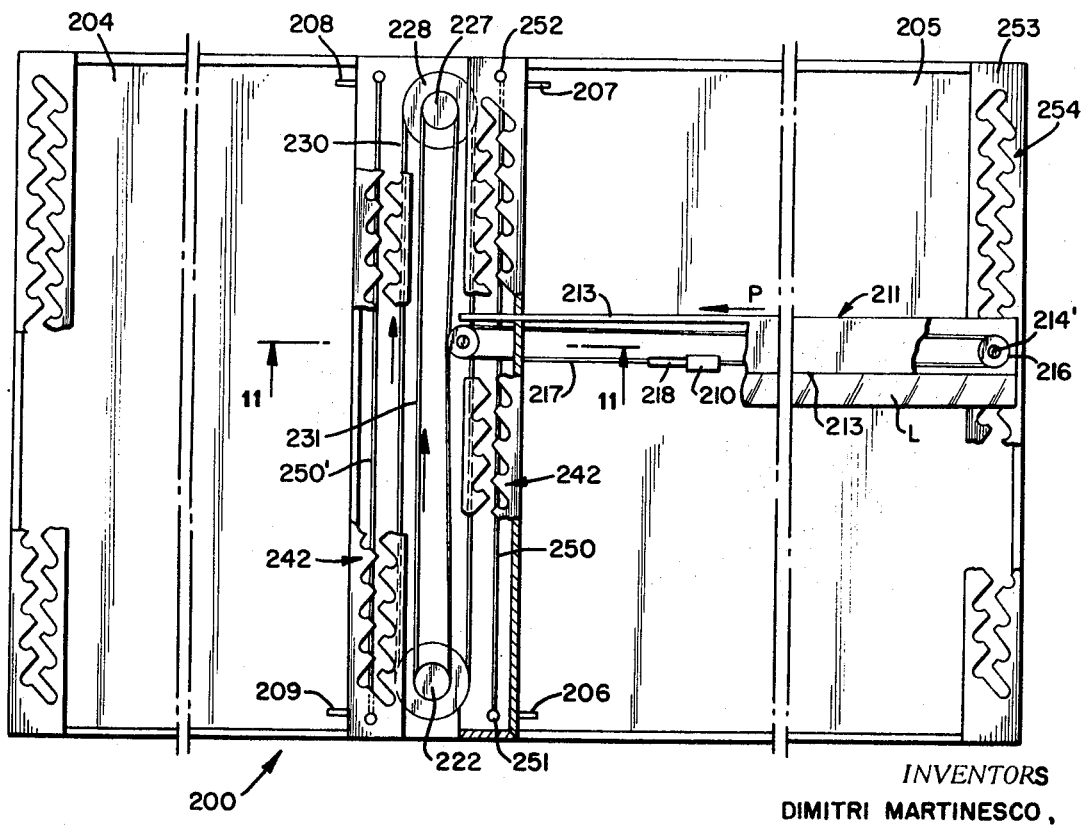
FIG. 10 is a plan view with broken away portions of a further alternative embodiment.

According to the invention, two plates 241 and 241' are provided on the spine of the binder 201 with two zigzag cut-outs 242 and 242' which extend longitudinally (FIGS. 10, 12 and 13). Each of these cut-outs, for example the cut-out 242 (FIG. 13), is defined by its edges 243 and 244. Edge 243 is formed by a succession of straight line portions and curved portions which comprise a rectilinear portion 245 joined at a sharp angle to a portion 246 inclined in another direction which is turn joined to a portion 247 having the same angle of inclination as the portion 246 by a round 248, and so on. The shape of the edge 244 is identical, the rounded portions 248' are however slightly shifted longitudinally with regard to the sharp angle joining the rectilinear portions 245 and 246 having an angle of inclination opposite of edge 243.

The covers 204 and 205 of the binder also have, along the opposed sides of the spine of the binder, for example in a plate 253, cut-outs 254 of the same shape as the cut-outs 242 and 242', these cut-outs serving from the positioning of the reading arm 211 carrying the playback head 210.

On the lower face of each plate 241 and 241' and in line with the cut-outs 242 and 242' are fixed resilient means, most simply formed as two strings 250, 250' of rubber or analogous plastics material attached at their ends, for example 251 and 252, by any appropriate means.

The operation of this embodiment is as follows:

The arm 211 is put in place in the binder 200 which is opened so that the pin 220 is engaged in the cut-out 242 and the analogous pin at the other end of the arm is engaged in the cut-out 253 of the cover 205. The on-off switch is closed and the rubber belts 230 and 231 are put into motion by means of the motor 221. The pin 220 is held, for example, in the position shown at $220_1$ in FIG. 13, by the resilient string 250. When the user pushes in the direction of the arrow p at the end of the arm in order to displace the arm against the force of the resilient string, the pin 220 guided in the cutout 242 moves into the position shown at $220_2$ in FIG. 13. The pin at the other end of the arm occupies a corresponding position so that the playback head 210 faces a track m of the upper sheet F in the cover 205.

As soon as the pin 220 reaches the position $220_2$, the endless belt 217 is moved into contact with the pulley belt 231 and the playback head 210 is driven in a direction opposite to that shown by the arrow p, i.e., direction of reading, at a speed which is the speed at which the track m is to be read.

When the playback head reaches the end of the track m, the user leaves the arm 211 which releases the force exerted by the resilient string 250 previously maintained under tension, thus exerting a force against the pin 220 which moves the arm 211 into a position in which said pin occupies the position as shown a $220_3$. In this position of the arm, the finger 219 cooperates with the inner face of the pulley belt 230 which is driven at a much greater speed than the pulley belt 231 because of the difference in the diameters of the pulleys on which they are mounted, so that the return movement of the playback head 210 in the direction of the arrow p is effected at a much greater speed that the reading movement.

If the user exerts again a force on the right end of the arm 211 when it is in the last described position, the arm is displaced until the pin 220 moves into the position $220_4$ shown in FIG. 13 which corresponds to a positioning of the playback head on the track immediately adjacent to the track which has just been read.

In this embodiment, means are also provided for interrupting the circuit between the playback head 210 and the amplifier disposed in the spine 201 of the binder 200, during the return movement of the playback head. In the example shown this means include two rectangular plates such as 260 having a slot 261 at the end of which are fixed electric contacts 262, 263 (FIG. 14) which are adapted to cooperate with the pins such as the pin 220 engaged in the said slot when arm 211 is put in position on the device.

Each plate 260 is preferably disposed in guides 265 and 266 provided in the plates 241 and 241' under the cutouts 242 and 242'. When a metal pin 220 reaches the bottom 264 of the slot, i.e., when the arm and the playback head are in reading position, the electric circuit between the playback head 210 and the amplifier is established by the conductors 267 and 268. For any other position of the construction, in particular those shown at $220_1$, $220_3$, etc. in which the return of the playback head is effectuated, the circuit is broken thereby obviating any disagreeable noise being heard by the user.

What we claim is:

1. An audio-visual device comprising: a support information directly readable by the human eye and information which is readable by a sound reading head being disposed on the support in an adjacent plurality of tracks, and a sound reading head displaceable along said tracks readable thereby, said support including a plurality of pages maintained in a binder which provides means for positioning the reading head; said binder being of loose-leaf type, the means for positioning the reading head being provided on the covers of said binder, said covers being formed as shallow containers of rigid material and being pivotally mounted on the spine of the binder, the pages being disposed in said covers; an arm for carrying the reading head, means for positioning said arm mounted on said covers, said arm having a U-shaped profile; an endless belt disposed in the arm, said reading head being fixed on said belt, means for driving the endless belt, and resilient means for maintaining the tension in the belts disposed between the reading head and the means for driving the endless belt; said means for driving the endless belt comprising two pulley belts driven at different speeds adapted to cooperate with the endless belt, a drum entraining the endless belt, and a finger fixed to said drum.

2. Structure in accordance with claim 1, wherein said pulley belts are driven by a miniature motor, by means of a pair of pulleys, the pulleys having different diameters for effecting the displacement of the reading head at a low speed and a high speed, respectively.

3. A device in accordance with claim 2, wherein the endless belt cooperates with the outer surface of the pully belt driven at a low speed, whereas the finger cooperates with the inner face of the pulley belt driven at a high speed, for displacing the reading head at different speeds in opposite directions.

4. Structure in accordance with claim 1, wherein the positioning means for the reading arm comprises zig-zag cutouts providing in plates mounted over the spine of the binder and on the end portion of at least one cover, resilient means being provided in the vicinity of at least one of said cutouts for moving the reading arm between successive positions for reading the sound recorded information, said arm comprising a pin depending therefrom and adapted to engage with any one of the cutouts and cooperating with said resilient means.

5. A device as claimed in claim 4, wherein switch means is provided in a circuit connecting the reading head with an amplifier, the switch means being actuated by said pin during the high speed return movement of the reading head.

* * * * *